W. J. PAGE.
JACK.
APPLICATION FILED JAN. 15, 1912.
1,079,316.
Patented Nov. 18, 1913.
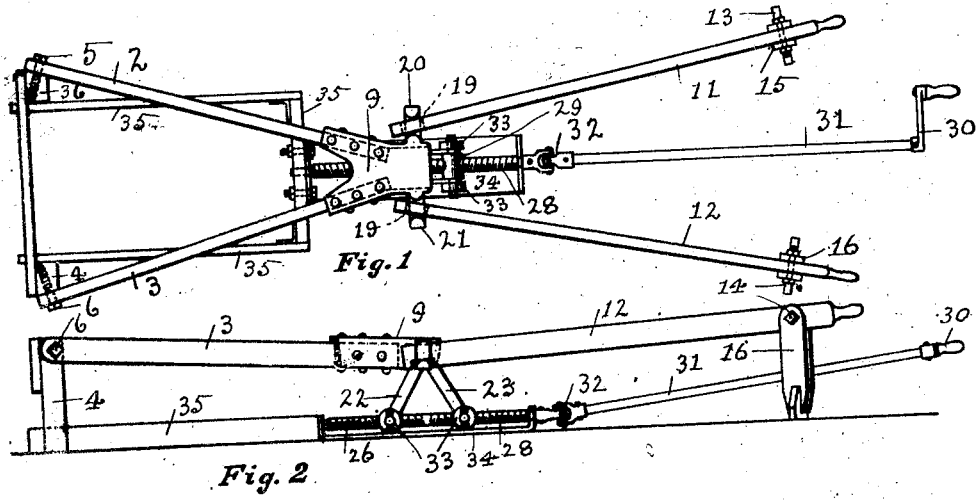
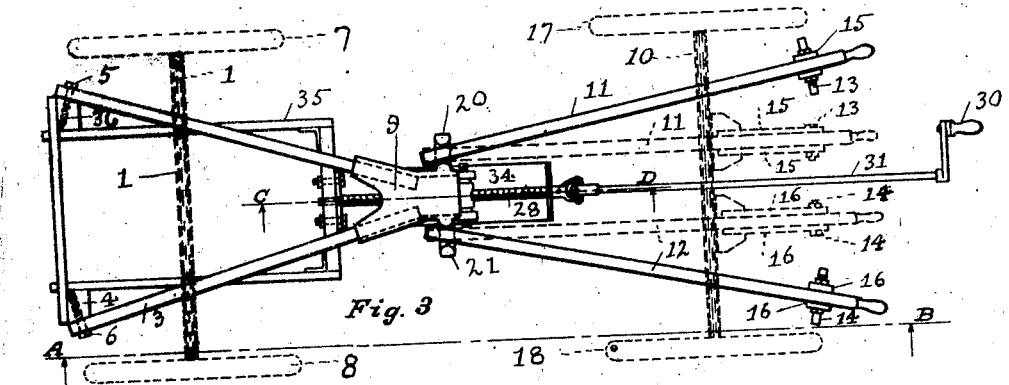
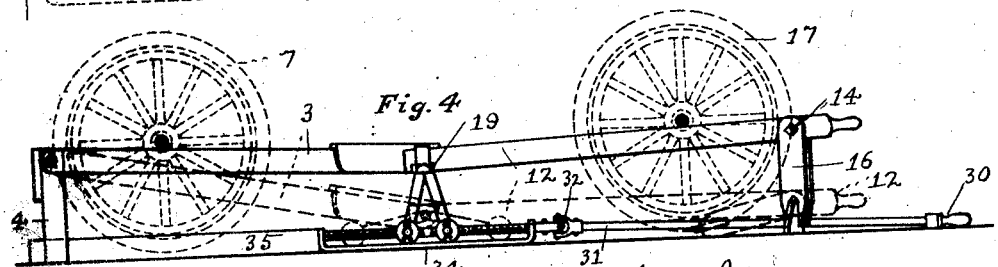
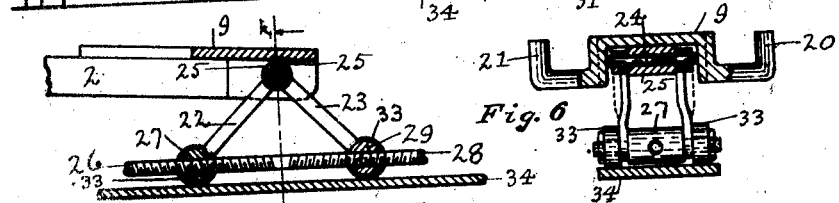
Witnesses
D. S. Cole
Mary Schulte
Inventor
William J. Page
By Wilson Wilson & Rice
Attorneys

UNITED STATES PATENT OFFICE.

WILLIAM J. PAGE, OF GRAND RAPIDS, MICHIGAN, ASSIGN O PAGE CORPORATION, A CORPORATION OF MICHIGAN.

JACK.

1,079,316.   Specification of Letters Patent.   Patented Nov. 18, 1913.

Application filed January 15, 1912. Serial No. 671,279.

*To all whom it may concern:*

Be it known that I, WILLIAM J. PAGE, a citizen of the United States, residing at Grand Rapids, in the county of Kent and State of Michigan, have invented new and useful Improvements in Jacks, of which the following is a specification.

My present invention relates to jacks, and its object is to provide an improved jack for raising a vehicle, as an automobile, to lift by one operation of the jack all the vehicle wheels from the ground. This object is attained by, and my invention finds a preferable embodiment in, the mechanism hereinafter described, illustrated by the accompanying drawings, in which:

Figure 1 is a plan view of the jack; Fig. 2 is a side elevation thereof; Fig. 3 is a plan view, illustrating in broken lines the position of a vehicle lifted thereby. Fig. 4 is a side elevation of the same, the near vehicle wheels being removed by the line of section A—B of Fig. 3; Fig. 5 is an enlarged vertical section of certain parts on line C—D of Fig. 3; and Fig. 6 is an enlarged transverse vertical section of such parts on a line corresponding to line E—F of Fig. 5.

The jack illustrated in the drawings has a lever adapted to raise one of the axles 1 of the vehicle, and comprising the members 2, 3, fulcrumed on suitable supports 36, 4 at 5, 6 respectively; these members are spaced at their fulcrum ends sufficiently apart to provide secure points of support for said axle toward the wheels 7, 8 thereof respectively, and at their opposite ends are connected as by the plate 9 so as to be operated as one lever. This jack also has a second lever adapted to raise the other vehicle axle 10, simultaneously with the operation of the lever raising axle 1. This second lever has members 11, 12, having fulcrums 13, 14 which fulcrums are adapted to be raised and lowered, as by turning the supporting posts 15, 16 of such fulcrums on their fulcrum pivots 13, 14 to a vertical position as shown in solid lines to raise the fulcrums, and to an approximately horizontal position as shown in broken lines to lower such fulcrums. The fulcrum ends of these members are adapted to be separated in the position shown in solid lines to provide secure points of support for the axle 10 toward the wheels 17, 18 thereof respectively, and at their opposite ends removably and pivotally rest by suitable notches 19 on the hooks 20, 21 carried by the plate 9, so that all the lever members 2, 3, 11 and 12 may be simultaneously raised and lowered by suitable means. Such means, as illustrated, comprise a toggle having toggle arms 22 and 23 with the pivotal connection 24 on which pivot turns an antifriction roller 25 adapted to support the levers through the plate 9 on whose under side it is adapted to roll. The free ends of these arms are moved toward each other to raise the jack, and oppositely to lower it, by a screw having right hand threads 26 carrying the nut 27 pivoted to the lower end of arm 22, and left hand threads 28 carrying the nut 29 pivoted to the lower end of arm 23, so that by rotating this screw, as by the crank handle 30 on the shaft 31 connected to the screw by a suitable universal joint 32, the nuts may be forced toward or away from each other as the screw is rotated one or the other direction. The nuts are provided with rollers 33 adapted to travel as in a suitable track pan 34 which may be attached to the supports 36, 4, as by a frame 35, for convenience in moving the machine about.

The jack is operated as follows: The arms 11, 12 are moved toward each other in the position shown in broken lines in Fig. 3, their supporting posts 15, 16, being turned to their horizontal position shown in broken lines in said figure, the screw having been first turned to separate the nuts and lower the jack. The vehicle is now run over the lowered arms from the right hand side of said figure, and to the position shown in Fig. 3; the arms 11, 12 are separated to the position shown in solid lines in said figure, and their supporting posts are raised to their vertical position. The screw being now rotated by the crank handle, the lever arms rise simultaneously and lift the vehicle by engaging its axles, so that the wheels clear the surface.

Not confining myself to the construction shown and described, I claim:

1. In a jack for vehicles, a lever adapted to directly engage an axle of the vehicle near its wheels and having its fulcrum stationary, a second lever adapted to engage the other axle of the vehicle near its wheels, and means for simultaneously operating both levers, the distance between the levers' fulcrums being greater than that between their points of such engagement.

2. In a jack for vehicles, a lever adapted to raise an axle of the vehicle, a second lever adapted to raise the other axle of the vehicle, means for supporting the fulcrum of one of said levers in a raised position and releasing it therefrom, and means for simultaneously operating both levers.

3. In a jack for vehicles, a lever adapted to raise an axle of the vehicle, a second lever comprising arms adapted to raise the other axle of the vehicle, the arms being divergingly separable at their fulcrum ends, and means for simultaneously operating both levers.

4. In a jack for vehicles, a lever adapted to raise an axle of the vehicle, a second lever comprising arms adapted to raise the other axle of the vehicle and being laterally separable at their fulcrum ends, means for supporting the fulcrums of said arms in a raised position and releasing them therefrom, and means for simultaneously operating said first mentioned lever and said arms.

5. In a jack for vehicles, a lever adapted to raise an axle of the vehicle, a second lever adapted to raise the other axle of the vehicle, and a toggle for raising both levers simultaneously.

6. In a jack for vehicles, a lever adapted to raise an axle of the vehicle, a second lever adapted to raise the other axle of the vehicle, a toggle for raising both levers simultaneously, said toggle comprising downwardly extending toggle arms, and a screw having oppositely threaded portions, one portion carrying a nut connected to one toggle arm and the other portion carrying a nut connected to the other toggle arm.

7. In a jack for vehicles, a lever adapted to raise an axle of the vehicle, a second lever adapted to raise the other axle of the vehicle, a toggle for raising both levers simultaneously, said toggle comprising downwardly extending toggle arms provided with supporting rollers, and a screw having oppositely threaded portions, one portion carrying a nut connected to one toggle arm and the other portion carrying a nut connected to the other toggle arm.

8. In a jack for vehicles, a lever adapted to raise an axle of the vehicle, a second lever adapted to raise the other axle of the vehicle, and a supporting post on which one lever is fulcrumed, said post being adapted to be turned on such fulcrum to one position to lower such fulcrum and to another position to raise it, and means for simultaneously operating both levers.

9. In a jack for vehicles, a lever adapted to raise an axle of the vehicle, a second lever adapted to raise the other axle of the vehicle, each said lever comprising two arms whose fulcrum ends are separated and whose free ends are connected between the fulcrums, and means supporting said free ends for simultaneously operating the levers, whereby the jack is supported at five points,—the four fulcrums, and the supporting operating means between the fulcrums.

10. In a jack for vehicles, a lever adapted to raise an axle of the vehicle, a second lever comprising arms adapted to raise the other axle of the vehicle and being pivotally related at their free ends and separable at their fulcrum ends, and means for simultaneously operating both levers.

11. In a jack for vehicles, a lever adapted to raise an axle of the vehicle, a second lever adapted to raise the other axle of the vehicle, a toggle for operating both levers simultaneously, said toggle comprising downwardly-extending toggle arms, and a shaft rotatable in a member connected to one toggle arm and having a screw-threaded portion carrying a nut connected to the other toggle arm.

In testimony whereof I have hereunto set my hand in presence of two subscribing witnesses.

WILLIAM J. PAGE.

Witnesses:
MARY SCHULTE,
MARY S. TOOKER.